US006592161B1

(12) United States Patent

Hsiao

(10) Patent No.: US 6,592,161 B1

(45) Date of Patent: Jul. 15, 2003

(54) MAGNETIC SWEEPER WITH TOOL RECEIVING SPACE

(76) Inventor: Chieh-Jen Hsiao, 2F, No. 215, Yu-Te Rd., Pei Dist., Taichung City (TW)

( * ) Notice: Subject to any disclaimer, the term of this patent is extended or adjusted under 35 U.S.C. 154(b) by 0 days.

(21) Appl. No.: 10/156,579

(22) Filed: May 24, 2002

(51) Int. Cl.$^{7}$ .............................. B25J 15/06; B66C 1/04

(52) U.S. Cl. ........................................ 294/65.5; 209/215

(58) Field of Search .......................... 294/65.5; 209/215, 209/228, 229; 414/439, 440; 335/285, 291, 293

(56) References Cited

U.S. PATENT DOCUMENTS

| | | | | | |
|---|---|---|---|---|---|
| 610,767 | A | * | 9/1898 | Monell | 209/219 |
| 1,326,561 | A | * | 12/1919 | Ady | 209/215 |
| 2,455,319 | A | * | 11/1948 | Stearns | 209/215 |
| 2,654,480 | A | * | 10/1953 | Stem | 209/215 |
| 2,693,279 | A | * | 11/1954 | Box et al. | 209/215 |
| 2,729,046 | A | * | 1/1956 | Patterson | 56/328.1 |
| 5,868,258 | A | * | 2/1999 | Hubbard, Jr. | 209/215 |
| 6,113,169 | A | * | 9/2000 | Gohman et al. | 294/65.5 |
| 6,402,212 | B1 | * | 6/2002 | Hsiao | 294/65.5 |

* cited by examiner

*Primary Examiner*—Dean J. Kramer

(74) *Attorney, Agent, or Firm*—Ostrolenk, Faber, Gerb & Soffen, LLP

(57) ABSTRACT

A magnetic sweeper includes an elongated mounting frame, a pair of rotating wheels, and a universal caster. The frame includes a barrier wall disposed behind a guide wall so as to define an axial hole therebetween, and a bottom plate. At least one magnetically attracting wheel is disposed in the axial hole, and is sleeved fixedly on a rotating shaft. The rotating wheels are rotatable relative to the frame to rotate the magnetically attracting wheel within the axial hole so as to magnetically attract metal objects onto the guide wall of the frame. Thereafter, the objects move from the guide wall to the barrier wall, and drop from the barrier wall to the bottom plate.

6 Claims, 4 Drawing Sheets

MAGNETIC SWEEPER WITH TOOL RECEIVING SPACE

BACKGROUND OF THE INVENTION

1. Field of the Invention

The invention relates to a magnetic sweeper, more particularly to a magnetic sweeper with a tool receiving space.

2. Description of the Related Art

In co-pending U.S. patent application Ser. No. 09/703,757, filed by the applicant on Nov. 1, 2000, there is disclosed a magnetic sweeper that includes a mounting frame with two side walls, a rotating shaft, a cylindrical body having a plurality of sections mounted on the rotating shaft, a plurality of magnets disposed respectively in the sections, a guiding member, a collecting member integrally formed with and disposed behind the guiding member, a mounting axle, a wheel member having two wheel bodies that are respectively mounted on two ends of the axle, a coupling member disposed to transmit rolling movement of the wheel bodies to the rotating shaft, and a handle. The lateral sides of the guiding member and the collecting member are respectively connected to the side walls of the frame. The two ends of the rotating shaft and the axle extend outboard to the side walls of the frame, respectively. As such, when the magnetic sweeper is pushed along a surface, the cylindrical body and the rotating shaft are brought to rotate in opposite directions. Metal objects are drawn to the guiding member and fall over the collecting member.

The aforementioned magnetic sweeper, however, has the following shortcomings:

1. The collecting member is not configured for receiving tools, such as hammer and screwdriver.
2. The wheel member limits the turning direction of the magnetic sweeper, thereby rendering the latter inconvenient to use.

SUMMARY OF THE INVENTION

Therefore, the main object of the present invention is to provide a magnetic sweeper with a tool receiving space and a universal caster that can facilitate the sweeping operation.

According to the present invention, a magnetic sweeper is adapted to be rolled over a surface to pick up metal objects scattered thereon, and comprises an elongated mounting frame, a magnetically attracting wheel assembly, a pair of rotating wheels, and a universal caster. The elongated mounting frame includes front end, a rear end, a guide wall disposed at the front end, a barrier wall, and a bottom plate. The barrier wall extends from the guide wall, and is disposed behind the guide wall so as to define cooperatively an axial hole therebetween that extends along a transverse direction of the mounting frame. The bottom plate is attached to and extends rearward from a lower end portion of the barrier wall. The guide wall has an upper end wall portion, a lower end wall portion, and an outer guide face that is disposed between the upper and lower end wall portions and that extends along a circumferential direction of the axial hole. The magnetically attracting wheel assembly is disposed in the axial hole in the mounting frame, and includes a rotating shaft journal led in the axial hole, at least one magnetically attracting wheel sleeved fixedly on the rotating shaft, and a plurality of magnet units attached to the magnetically attracting wheel. The rotating wheels are mounted rotatably and respectively on two opposite sides of the mounting frame, and are rotatable relative to the mounting frame to rotate the magnetically attracting wheel within the axial hole so as to be adapted to magnetically attract the objects onto the guide face of the mounting frame, thereby moving the objects from the lower end wall portion to the upper end wall portion along the guide face, after which the objects drop from the upper end wall portion to the bottom plate of the mounting frame. The universal caster is mounted on the bottom plate of the mounting frame, and cooperates with the rotating wheels so as to be adapted to support the mounting frame on the surface.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
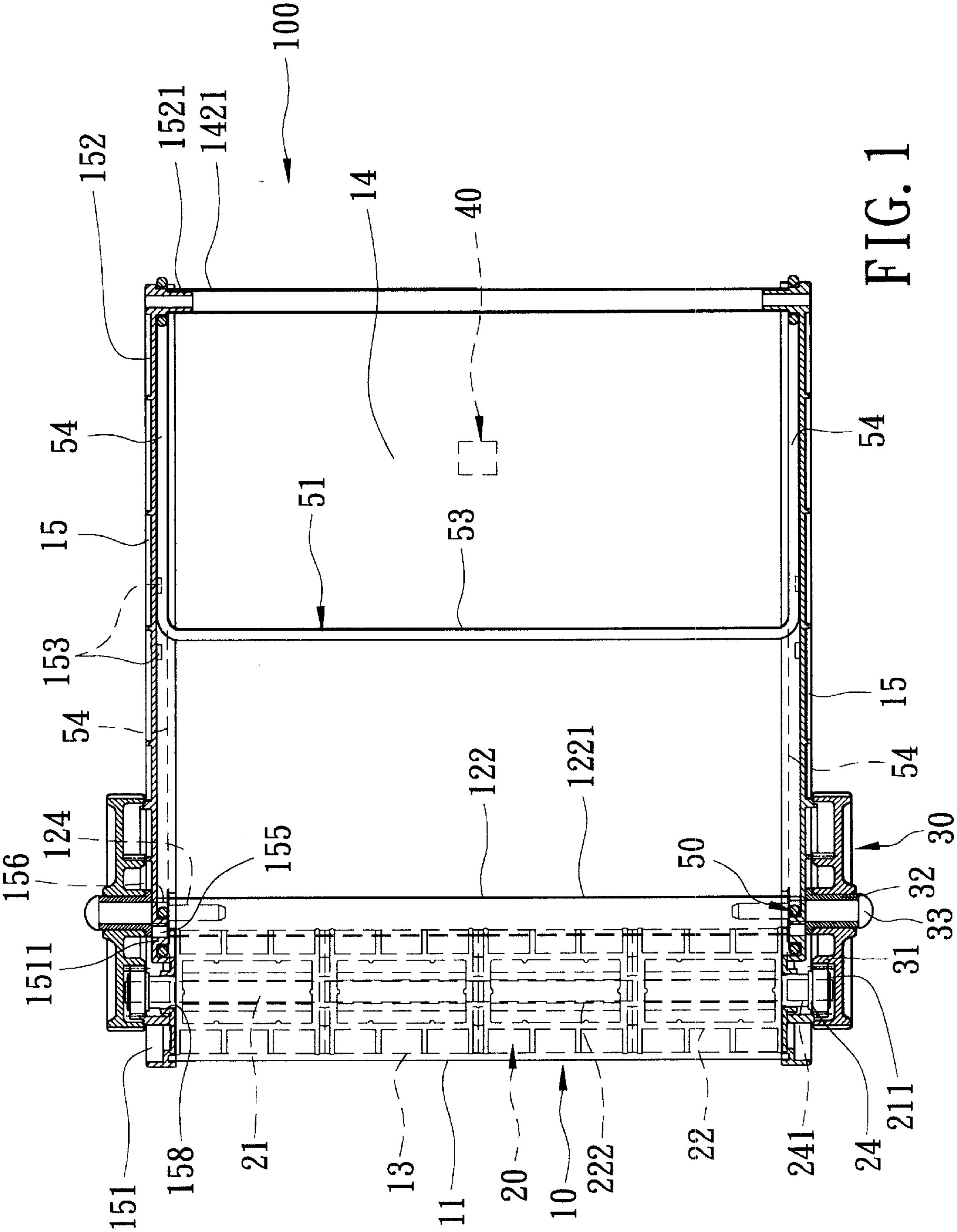
FIG. 1 is a sectional view of the preferred embodiment of a magnetic sweeper according to the present invention.

Referring to FIGS. 1 to 4, the preferred embodiment of a magnetic sweeper 100 according to the present invention is shown to be adapted to be rolled over a surface 400 to pickup metal objects 300, such as nails, screws, and nuts, scattered thereon. As shown, the magnetic sweeper 100 comprises an elongated mounting frame 10, a magnetically attracting wheel assembly 20, a pair of rotating wheels 30, a universal caster 40, and a pair of U-shaped front.and rear handles 50, 51.

The elongated mounting frame 10 includes a front end 101, a rear end 102 opposite to the front end 101, a guide wall 11 disposed at the front end 101, a barrier wall 12, a bottom plate 14, and two vertical side walls 15. The barrier wall 12 extends from the guide wall 11, and is disposed behind the guide wall 11 so as to define cooperatively an axial hole 13 therebetween that extends along a transverse direction of the mounting frame 10. The barrier wall 12 has a lower end portion 121 and an upper end portion 122, and is formed with three threaded holes 123, 124, 125. The bottom plate 14 is attached to and extends rearward from the lower end portion 121 of the barrier wall 12.

The guide wall 11 has an upper end wall portion 112, a lower end wall portion 111, and an outer guide face 113 that is disposed between the upper and lower end wall portions 112, 111 and that extends along a circumferential direction of the axial hole 13. The lower end portion 121 of the barrier wall 12 has a rear side surface, which is formed with an engaging groove 1211 that extends forward along a longitudinal direction of the mounting frame 10. The upper end portion 122 of the barrier wall 12 is formed with a blocking portion 1221 that is disposed proximately behind and below the upper end wall portion 112 of the guide wall 11 so as to be adapted to permit dropping of the objects 300 from the blocking portion 1221 onto the bottom plate 14.

The bottom plate 14 has a front end portion 141 that is inserted into the engaging groove 1211 in the barrier wall 12, a horizontal intermediate portion 143 for disposal of tools 200 (see FIG. 3), such as hammer and screwdriver, and an upwardly curved rear end portion 142. The rear end portion 142 of the bottom plate 14 has a rolled distal end 1421.

Each of the vertical side walls 15 is formed with a slot 154 that engages a respective one of two opposite sides of the bottom plate 14 so as to close two ends of the axial hole 13 in the mounting frame 10, and includes a pair of front and rear end portions 151, 152. Each of the front and rear end portions 151, 152 of each side wall 15 is formed with an inwardly extending integral horizontal pivot pin 1511, 1521. The front end portion 151 of each side wall 15 is further formed with three fastening holes 155, 156, 157 that are aligned respectively with the three threaded holes 123, 124, 125 in the barrier wall 12, and an axial mounting hole 158. During assembly, the rolled distal end 1421 of the bottom plate 14 is wound on the pivot pins 1521 at the rear end portions 152 of the side walls 15. Thereafter, a plurality of screws are passed respectively through the three fastening holes 155, 156, 157 in the side walls 15, and are engaged respectively to the three threaded holes 123, 124, 125 in the barrier wall 12, thereby fastening the side walls 15 on the guide wall 11, the barrier wall 12, and the bottom plate 14 so as to form the mounting frame 10.

The side walls 15 cooperate with the barrier wall 12 and the bottom plate 14 to define an upwardly-opening receiving space 16 for receiving the objects 300 that drop from the blocking portion 1221 of the barrier wall 12. The receiving space 16 is formed above the intermediate portion 143 of the bottom plate 14. Each of the side walls 15 further has a stepped inner face 1501 that has a horizontal shoulder 1502, and two inwardly extending integral projections 153 that are formed above the shoulder 1502 and that are disposed within the receiving space 16.

The magnetically attracting wheel assembly 20 is disposed in the axial hole 13 in the mounting frame 10, and includes a hexagonal cross-sectioned rotating shaft 21 journal led in the axial hole 13, four magnetically attracting wheels 22 sleeved fixedly on the rotating shaft 21, three angularly equidistant magnet units 23 attached to each magnetically attracting wheel 22, and a pair of driven gears 24. Each of the magnetically attracting wheels 22 is provided with a central hexagonal hole 222 for extension of the rotating shaft 21, and is formed with a circumferential wall provided with three recesses 221 that are angularly spaced apart from one another. Each of the magnet units 23 is disposed in a respective one of the recesses 221 in the magnetically attracting wheels 22. The driven gears 24 are formed with a hexagonal engaging hole 241 for extension of the rotating shaft 21 therethrough, and are sleeved fixedly and respectively on two ends of the rotating shaft 21. When the rotating shaft 21 and the magnetically attracting wheels 22 are connected to form a single body, and are disposed in the axial hole 13 in the mounting frame 10, the two ends of the rotating shaft 21 extend outboard to the left and right side walls 15 of the mounting frame 10. Each of the driven gears 24 is retained on the rotating shaft 21 by means of a C-shaped retaining ring 211 that engages a corresponding end of the rotating shaft 21, and is journal led within the axial mounting hole 158 in a respective one of the side walls 15. When the driven gears 24 are driven to rotate, the rotating shaft 21 and the magnetically attracting wheels 22 are also driven to rotate within the axial hole 13 so as to magnetically attract the objects 300 on the outer guide surface 113 of the guide wall 11 of the mounting frame 10.

Figure 2:
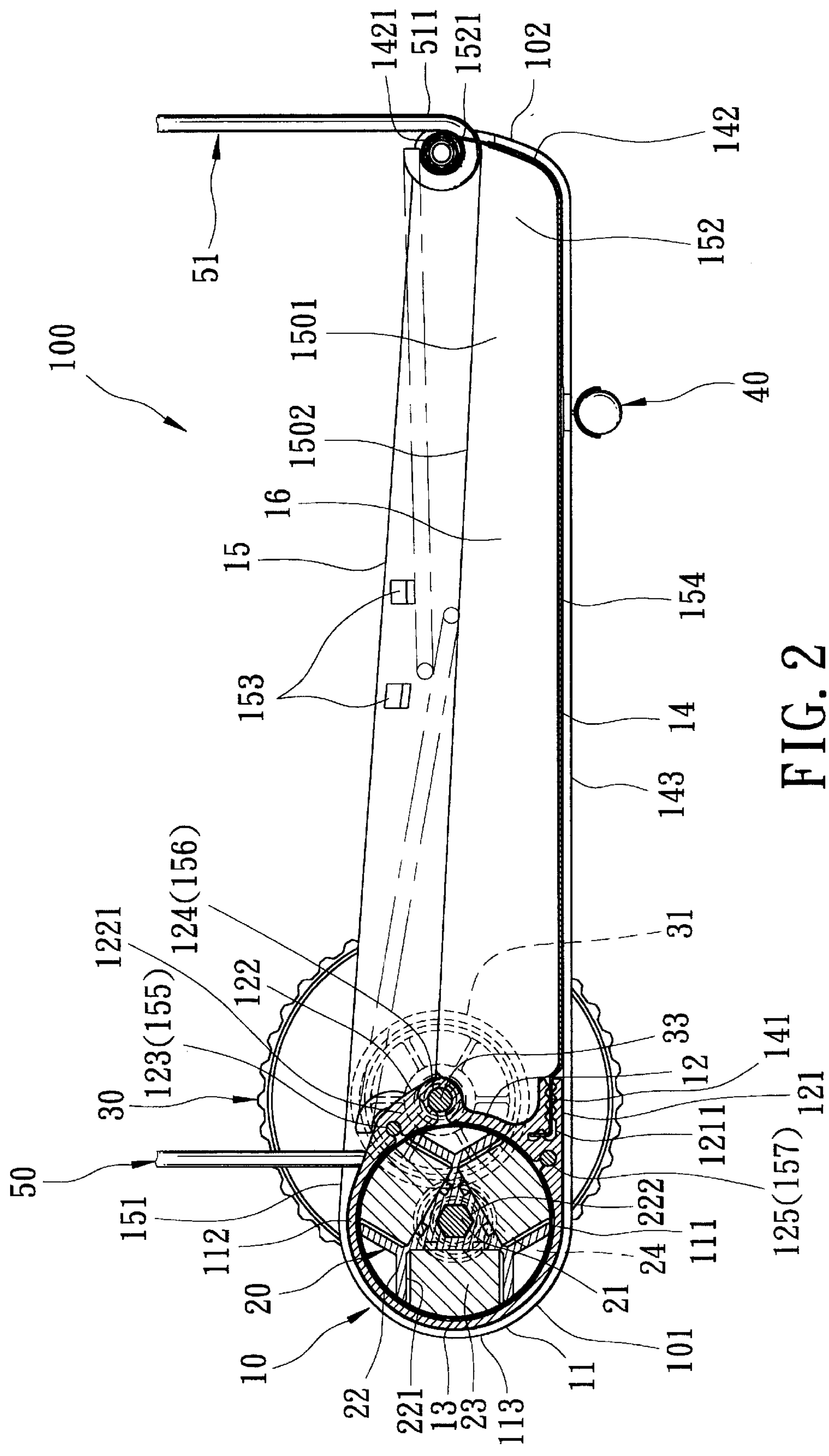
FIG. 2 is a fragmentary sectional view of the preferred embodiment, illustrating how front and rear handles are fixed on a mounting frame.
Figure 3:
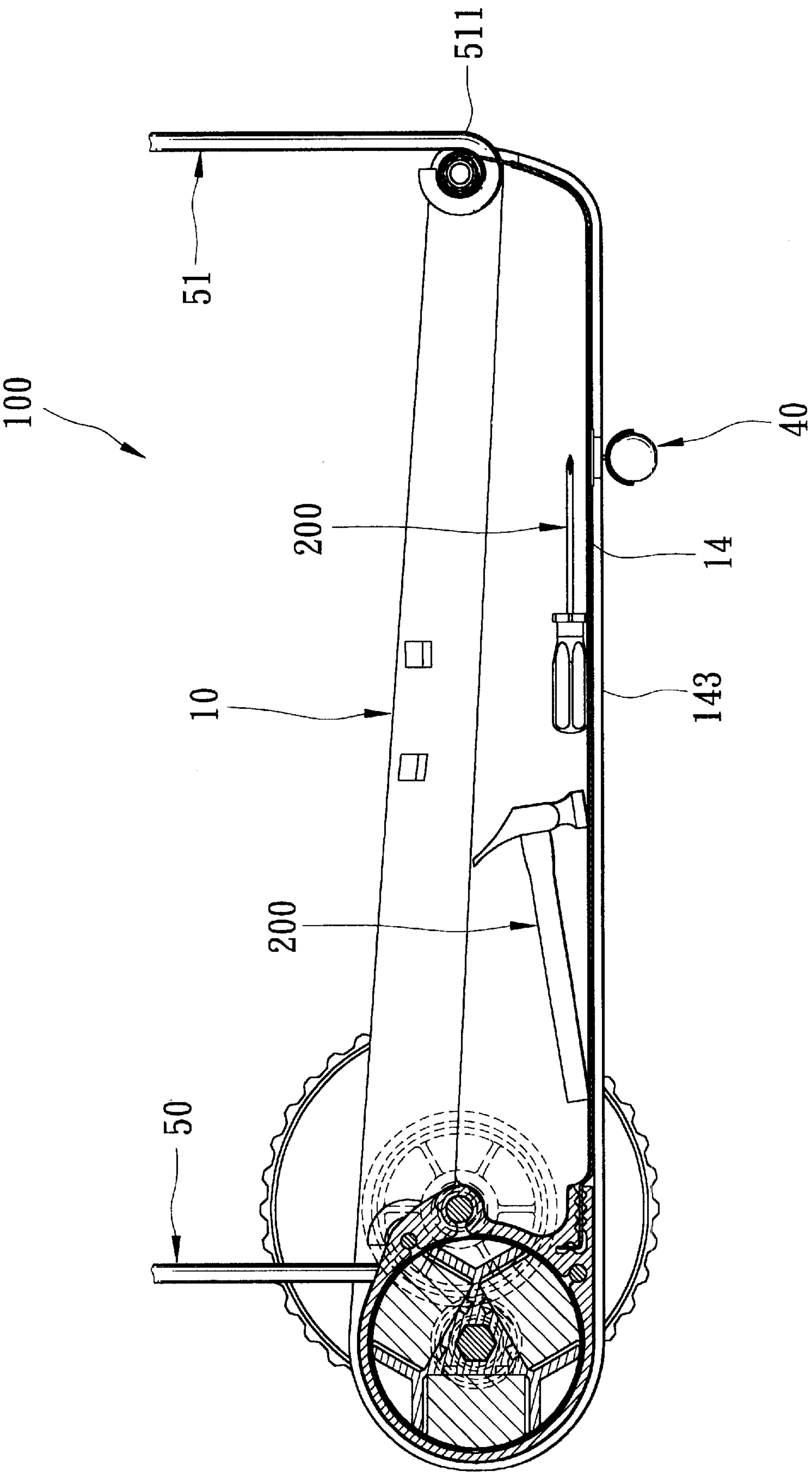
FIG. 3 is a sectional view of the preferred embodiment, illustrating how tools are disposed on a bottom plate of the mounting frame of the preferred embodiment.
Figure 4:
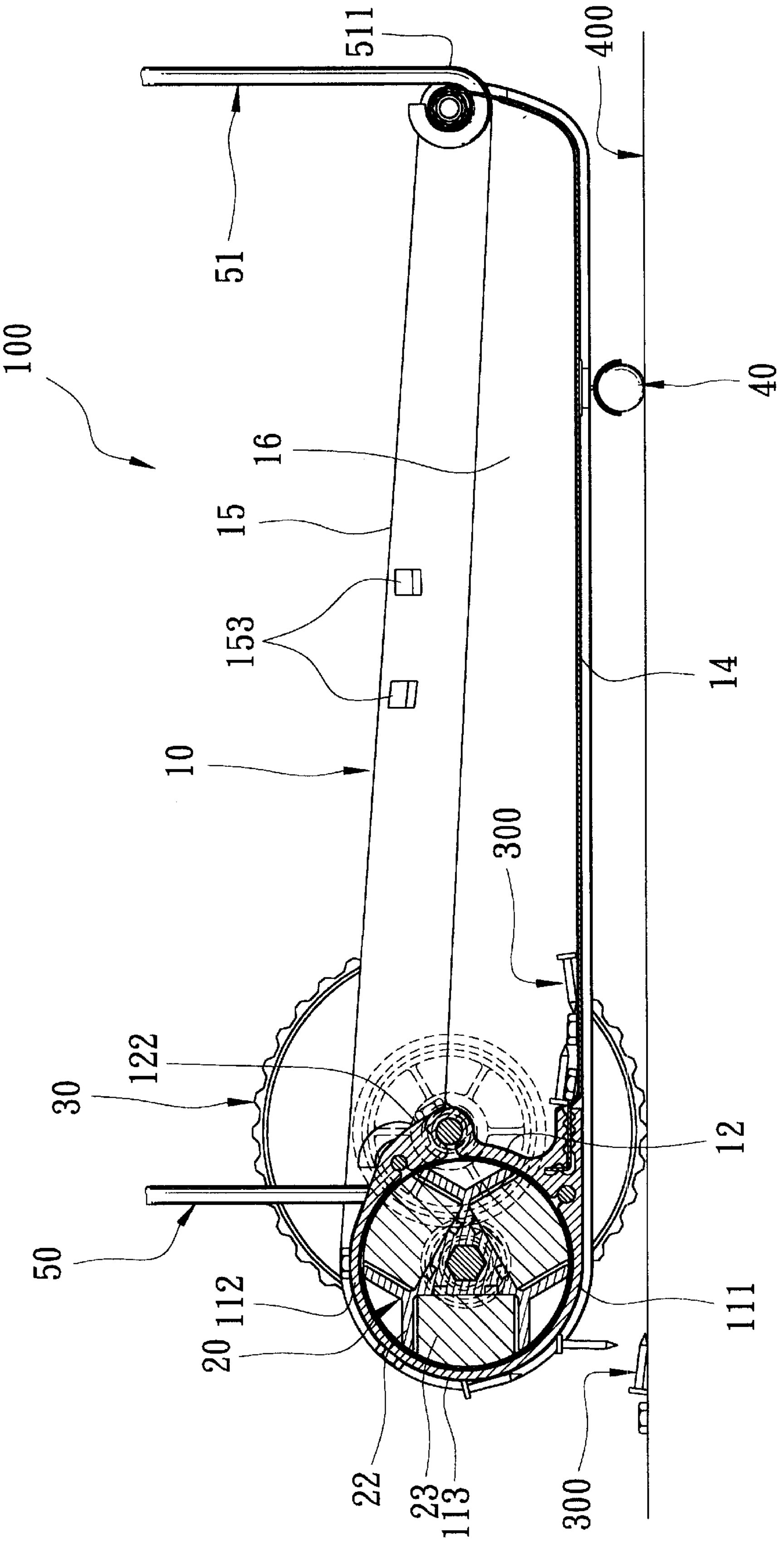
FIG. 4 illustrates the preferred embodiment in a state of use.

The blocking portion 1221 of the barrier wall 12 extends integrally, rearwardly, and downwardly from and is thicker than the upper end wall portion 112 of the guide wall 11, as best shown in FIGS. 2 to 4, so that no magnetic attraction exists between the objects 300 and the magnet units 23 when the objects 300 contact the blocking portion 1221.

Each of the rotating wheels 30 is sleeved on a bushing 32, and includes a driving gear 31 that is fixed coaxially thereon and that meshes with a respective one of the driven gears 24 so as to rotate the magnetically attracting wheels 22 in a direction opposite to that of the rotating wheels 30 when the rotating wheels 30 rotate on the surface 400. Each rotating wheel 30 is mounted rotatably on a respective side of the mounting frame 10 by means of a screw bolt 33 that passes through the bushing 32 of a corresponding rotating wheel 30 and the fastening hole 146 in the respective one of the side walls 15, and that engages a respective threaded hole 124 in the barrier wall 12. As such., the rotating wheels 30 are rotatable relative to the mounting frame 10, and drive the magnetically attracting wheels 22 to rotate within the axial hole 13 in the mounting frame 10.

The universal caster 40 is mounted on the intermediate portion 143 of the bottom plate 14 of the mounting frame 10, and cooperates with the rotating wheels 40 so as to be adapted to support the mounting frame 10 on the surface 400 and to move the mounting frame 10 in any desired direction.

The front handle 50 has two curved ends (not visible) that are sleeved respectively and rotatably on the pivot pins 1511 on the front end portions 151 of the side walls 15. The rear handle 51 has two curved ends 511 (only one is shown in FIGS. 2 to 4) that are sleeved respectively and rotatably on the pivot pins 1521 on the rear end portions 152 of the sidewalls 15. The rolled distal end 1421 on the rear end portion 142 of the bottom plate 14 is disposed between the two curved ends 511 of the rear handle 51. Each of the front and rear handles 50, 51 has a grip portion 53 that is rotatable into the receiving space 16, and two parallel arms 54 connected integrally and respectively to opposite ends of the grip portion 53. The grip portions 53 of the handles 50, 51 are formed from metal strips, and are confined between the shoulders 1502 and the projections 153 on the side walls 15 of the mounting frame 10 when the grip portions 53 are rotated forcibly into the receiving space 16 by pushing the arms 54 toward each other. The grip portions 53 can be held and lifted so as to separate the magnetic sweeper 100 from the surface 400, thereby permitting movement of the magnetic sweeper 100 to another place.

When a user sits on the surface 400 to fix something, the tools 200, such as a hammer and a screwdriver (see FIG. 3), can be disposed on the intermediate portion 143 of the bottom plate 14 of the magnetic sweeper 100. The user can move the magnetic sweeper 100 to any desired direction due to the presence of the universal caster 40 on the magnetic sweeper 100 so as to facilitate different work requirements of the user.

In use, when the magnetic sweeper 100 is pushed along the surface 400, the metal objects 300 are picked up, and are magnetically drawn onto the guide face 113 of the mounting frame 10. The objects 300 move from the lower end wall portion 111 to the upper end wall portion 112 along the guide face 113 of the mounting frame 10, and drop from the upper end wall portion 112 into the receiving space 16 in the mounting frame 10, as best illustrated in FIG. 4. Due to the configuration of the barrier wall 12 that is formed with the blocking portion 122, the objects 300 are prevented from falling back onto the surface 400. After the sweeping operation is completed, the parallel arms 54 of the handles 50, 51 are pressed toward each other, thereby permitting the handles 50, 51 to rotate into the receiving space 16 for storage.

Thus, the magnetic sweeper 100 of the present invention is convenient to use due to the presence of the tool receiving space, and can be moved easily in any desired direction to collect the metal objects 300 scattered throughout the surface 400.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A magnetic sweeper adapted to be rolled over a surface to pick up metal objects scattered thereon, said magnetic sweeper comprising:

an elongated mounting frame including a front end, a rear end, a guide wall disposed at said front end, a barrier wall extending from said guide wall and disposed behind said guide wall so as to define cooperatively an axial hole therebetween that extends along a transverse direction of said mounting frame, and a bottom plate attached to and extending rearward from a lower end portion of said barrier wall, said guide wall having an upper end wall portion, a lower end wall portion, and an outer guide face that is disposed between said upper and lower end wall portions and that extends along a circumferential direction of said axial hole;

a magnetically attracting wheel assembly disposed in said axial hole in said mounting frame and including a rotating shaft journal led in said axial hole, at least one magnetically attracting wheel sleeved fixedly on said rotating shaft, and a plurality of magnet units attached to said magnetically attracting wheel;

a pair of rotating wheels mounted rotatably and respectively on two opposite sides of said mounting frame and rotatable relative to said mounting frame to rotate said magnetically attracting wheel within said axial hole so as to be adapted to magnetically attract the objects onto said guide face of said mounting frame, thereby moving the objects from said lower end wall portion to said upper end wall portion along said guide face, after which the objects drop from said upper end wall portion to said bottom plate of said mounting frame; and a universal caster mounted on said bottom plate of said mounting frame and cooperating with said rotating wheels so as to be adapted to support said mounting frame on the surface.

2. The magnetic sweeper as claimed in claim 1, wherein said lower end portion of said barrier wall has a rear side surface, which is formed with an engaging groove that extends forward along a longitudinal direction of said mounting frame, said barrier wall further having an upper end portion that is formed with a blocking portion that is disposed proximately behind and below said upper end wall portion of said guide wall so as to be adapted to permit dropping of the objects from said blocking portion on to said bottom plate, said bottom plate having a front end portion that is inserted into said engaging groove in said barrier wall, a horizontal intermediate portion, and an upwardly curved rear end portion, said mounting frame further including two vertical side walls, each of which is formed with a slot that engages a respective one of two opposite sides of .said bottom plate so as to close two ends of said axial hole in said mounting frame, whereby, said barrier wall, said bottom plate, and said side walls cooperate to define an upwardly-opening receiving space thereamong for receiving the objects that drop from said blocking portion of said barrier wall.

3. The magnetic sweeper as claimed in claim 2, wherein said blocking portion of said barrier wall extends integrally, rearwardly, and downwardly from and is thicker than said upper end wall portion of said guide wall so that no magnetic attraction exists between the objects and said magnet units when the objects contact said blocking portion.

4. The magnetic sweeper as claimed in claim 2, further comprising a pair of U-shaped front and rear handles, said rear end portion of said bottom plate having a rolled distal end, each of said side walls having a pair of front and rear end portions, each of which is formed with an inwardly extending integral horizontal pivot pin, said rolled distal end of said bottom plate being wound on said pivot pins on said rear end portions of said side walls, said front handle having two ends that are sleeved respectively and rotatably on said pivot pins on said front end portions of said side walls, said rear handle having two ends that are sleeved respectively and rotatably on said pivot pins on said rear end portions of said side walls, each of said front and rear handles having a grip portion that is rotatable into said receiving space.

5. The magnetic sweeper as claimed in claim 4, wherein each of said side walls further has a stepped inner face that has a horizontal shoulder, and two inwardly extending integral projections that are formed above said shoulder and that are disposed within said receiving space, said grip portions of said front and rear handles being formed from metal strips and being confined between said shoulders and said projections when said grip portions rotate into said receiving space.

6. The magnetic sweeper as claimed in claim 1, wherein said magnetically attracting wheel assembly further includes a pair of driven gears that are sleeved respectively and fixedly said two ends of said rotating shaft, each of said rotating wheels including a driving gear that is fixed coaxially thereon and that meshes with a respective one of said driven gears so as to rotate said magnetically attracting wheels in a direction opposite to that of said rotating wheels when said rotating wheels move on said surface.

* * * * *